United States Patent [19]

Leroy et al.

[11] Patent Number: 4,590,591
[45] Date of Patent: May 20, 1986

[54] ACOUSTIC DISTANCE MEASURING APPARATUS AND METHOD OF USE

[75] Inventors: Claude Leroy, Bandol; Guy Parent, Le Plessis Robinson, both of France

[73] Assignee: Sintra-Alcatel, Asnieres, France

[21] Appl. No.: 515,831

[22] Filed: Jul. 21, 1983

[30] Foreign Application Priority Data

Jul. 21, 1982 [FR] France .............................. 82 12742

[51] Int. Cl.$^4$ .......................................... G01S 15/06
[52] U.S. Cl. .............................................. 367/6
[58] Field of Search ......................................... 367/6, 2

[56] References Cited

U.S. PATENT DOCUMENTS

4,229,809 10/1980 Schwalbe ............................... 367/6

FOREIGN PATENT DOCUMENTS

2089043 6/1982 United Kingdom ..................... 367/6

OTHER PUBLICATIONS

L. C. Rogers "Deepwater-Positioning Problems Solved for Mohole Rig" the Oil and Gas Journal vol. 62, No. 38, pp. 196,197 and 199, Tulsa Oklahoma (U. S. 9/21/64).

*Primary Examiner*—Richard A. Farley
*Attorney, Agent, or Firm*—Sughrue, Mion, Zinn, Macpeak, and Seas

[57] ABSTRACT

Acoustic distance measuring apparatus for measuring the distance of a vessel (N) from a vertical line through a fixed point (P) on the bottom of a body of water, the apparatus comprising: an acoustic emitter unit (I) and at least three acoustic receiver units (H1, H2, H3) disposed on the bottom of the vessel, said receiver units being disposed at the vertices of a plane polygon; at least three acoustic emitter/receiver units (A, B, C) placed on the water bottom in the vicinity of said fixed point (P), said emitter/receiver units being disposed at the vertices of a polygon; and the improvement wherein the measuring apparatus further includes a relay acoustic emitter/receiver (R) submerged close to the vessel at a depth where vessel noise is highly attenuated, said relay receiving acoustic waves (a) from the vessel's emitter and responding by emitting acoustic wave (1, 2, 3) to the vessel's receiver units thereby enabling the distances between the relay and each of the vessel's receiver units to be calculated, said bottom emitter/receiver units also receiving acoustic waves (a) from the vessel's emitter and being arranged to respond in succession, i.e. after respective predetermined time delays, by emitting acoustic signals (f2) which are received by the relay and which are re-emitted (4) therefrom after amplification to be received by one of the vessel's receiver units (H1), thereby enabling the distances between the relay and each of the bottom emitter/receivers (RA, RB, RC) to be calculated on the basis of the different transit times for the signals from each bottom emitter/receiver, and further enabling the distance of the vessel from a vertical line through said fixed point to be calculated.

7 Claims, 4 Drawing Figures

ACOUSTIC DISTANCE MEASURING APPARATUS AND METHOD OF USE

The present invention relates to acoustic distance measuring apparatus, mainly intended to measure the distance between a vessel and a fixed point on the water bottom. The result of the measurement is supplied to a system for dynamically positioning the vessel relative to said point. The invention also relates to a method of using the apparatus.

BACKGROUND OF THE INVENTION

Known acoustic distance measuring apparatuses essentially comprise (see FIG. 1) an acoustic wave emitter E placed on the vessel N and emitting towards the bottom aiming for an acoustic responder S placed on the water bottom at said fixed point or near thereto. In response to the sound signals it receives, the responder S emits a pulse which is received by a group of hydrophones L1, L2 and L3 disposed underneath the vessel at corners of a polygon. By measuring the differences in time taken for the sound pulse to travel along the paths SL1, SL2 and SL3 between the bottom responder and the onboard hydrophones, and knowing at least one of the distances L1 L2, L2 L3, L3 L1 between the hydrophones or at least the depth H of the water, it is possible to determine the distance between a vertical line passing through the onboard emitter and a vertical line passing through the bottom responder. For more detail on the required calculations, reference can be made to the following publications:

System d'ancrage dynamique du PELICAN. Colloque GRETSI, Nice 1973, by Claude LEROY.

Localisation sous-marine précise dans les trois dimensions. Colloque GRETSI, Nice 1973 by Claude LEROY.

Acoustic measuring system and its performances. Preprints of the 1974 OTC Conference Vol 1 6–8 May 1974.

In other distance measuring apparatuses, an acoustic emitter/receiver E' is placed on the bottom of the vessel and it interrogates a plurality of responders A', B', C' disposed on the water bottom adjacent to the fixed point (see FIG. 2). By measuring the elapsed time differences over the paths E'A', E'B' and E'C' the same results can be obtained as above.

The above described apparatuses are unusable when the water is more than 3000 meters deep and the vessel itself is a considerable source of noise (e.g. drilling ship or platform).

The signal received by the, or each, onboard hydrophone is highly attenuated after a long path through the water, and is therefore capable of being drowned by the noisy environment such that unless suitable modifications are made to the apparatus, the signals become unusable.

A first proposed modification has been to increase the power of the, or each, responder. However, while a conventional type of responder operating at 25 kHz requires a power of 4 kw for operating in depths of 3000 meters, it will require a power of 2000 kw at 6000 meters, given that a sound signal is attenuated by 7 dB/km. Thus, relative to a source at 3000 meters, a source at 6000 meters provides a signal whose attenuation, expressed in dB, is 20 log (6000/3000) (for the divergence), increased by 7×3, giving a total of 27 dB. Providing the, or each, responder with a power of about 1000 kw is not practical, even in conditions where the installation is expected to operate for several months without interruption.

A second proposed modification is to use directional responders operating at a lower frequency (e.g. 10 to 12 kHz) for which the propagation attentuation is smaller, about 1.5 dB/km).

This solution is not desirable since it would require considerable development to get it operational, and requires a new type of responder to be manufactured, and in any case leads to a lower measurement accuracy.

Further, it would require existing hydrophones to be replaced which would make existing equipment obsolete.

Preferred embodiments of the present invention thus enable acoustic distance measurements to be made on noisy vessels and over great depths (more than 3000 meters and in particular up to 600 meters) without modifying existing equipment and without providing them with a large increase in power.

SUMMARY OF THE INVENTION

The present invention provides acoustic distance measuring apparatus for measuring the distance of a vessel N from a vertical line through a fixed point P on the bottom of a body of water, the apparatus comprising: an acoustic emitter unit and at least three acoustic receiver units disposed on the bottom of the vessel, said receiver units being disposed at the vertices of a plane polygon; at least three acoustic emitter/receiver units placed on the water bottom in the vicinity of said fixed point P, said emitter/receiver units being disposed at the vertices of a polygon; and the improvement wherein the measuring apparatus further includes a relay acoustic emitter/receiver submerged close to the vessel at a depth where vessel noise is highly attenuated, said relay receiving acoustic waves from the vessel's emitter and responding by emitting acoustic waves to the vessel's receiver units thereby enabling the distances between the relay and each of the vessel's receiver units to be calculated, said bottom emitter/receiver units also receiving acoustic waves from the vessel's emitter and being arranged to respond in succession, i.e. after respective predetermined time delays, by emitting acoustic signals which are received by the relay and which are re-emitted therefrom after amplification to be received by one of the vessel's receiver units, thereby enabling the distances between the relay and each of the bottom emitter/receivers to be calculated on the basis of the different transit times for the signals from each bottom emitter/receiver, and further enabling the distance of the vessel from a vertical line through said fixed point to be calculated.

Advantageously, the bottom emitter/receivers are provided with inhibition means that operate for a given length of time after an emission. Further, they are provided with a threshold below which they do not emit any response.

The relay emitter/receiver is directional and is directed downwards in such a manner as to have a high degree of attentuation for signals coming from above.

The bottom emitter/receivers respond only on reception of a code proper thereto or a given frequency equal to the frequency at which they emit in response.

The relay emitter/receiver responds on reception of the codes of the bottom emitter/receivers as well as on reception of the emission frequencies of said bottom emitter/receivers.

The relay emitter/receiver emits a response signal at a different frequency from the emission frequency of the bottom emitter/receivers.

The invention also relates to a method for using the above apparatus.

BRIEF DESCRIPTION OF THE DRAWINGS

An embodiment of the invention is described by way of example with reference to the accompanying drawings in which:

FIG. 3 is a diagram for explaining the invention and shows the various components which make up apparatus in accordance with the invention and also serves to illustrate how the apparatus is used.

In FIG. 4 is shown the circuitry required for the responders A, B, C. Each responder has a receiver 10 and an inhibiting circuit 12 that prevents reception of a signal for a fixed time after a control signal is received by the inhibit circuit 12. The responders A, B and C have respective code detectors 14, 16 and 18 that recognize both a signal at frequency f2 and a respective code a, b and c. The outputs of the code detectors 14, 16 and 18 are delayed for respective periods tA, tB and tC by respective delay circuits 20, 22 and 24. The outputs of the delay circuits 20, 22 and 24 supply the control signals to the inhibiting circuits 12 and to emitters 26 which emit at a frequency f2.

MORE DETAILED DESCRIPTION

Figure 1:
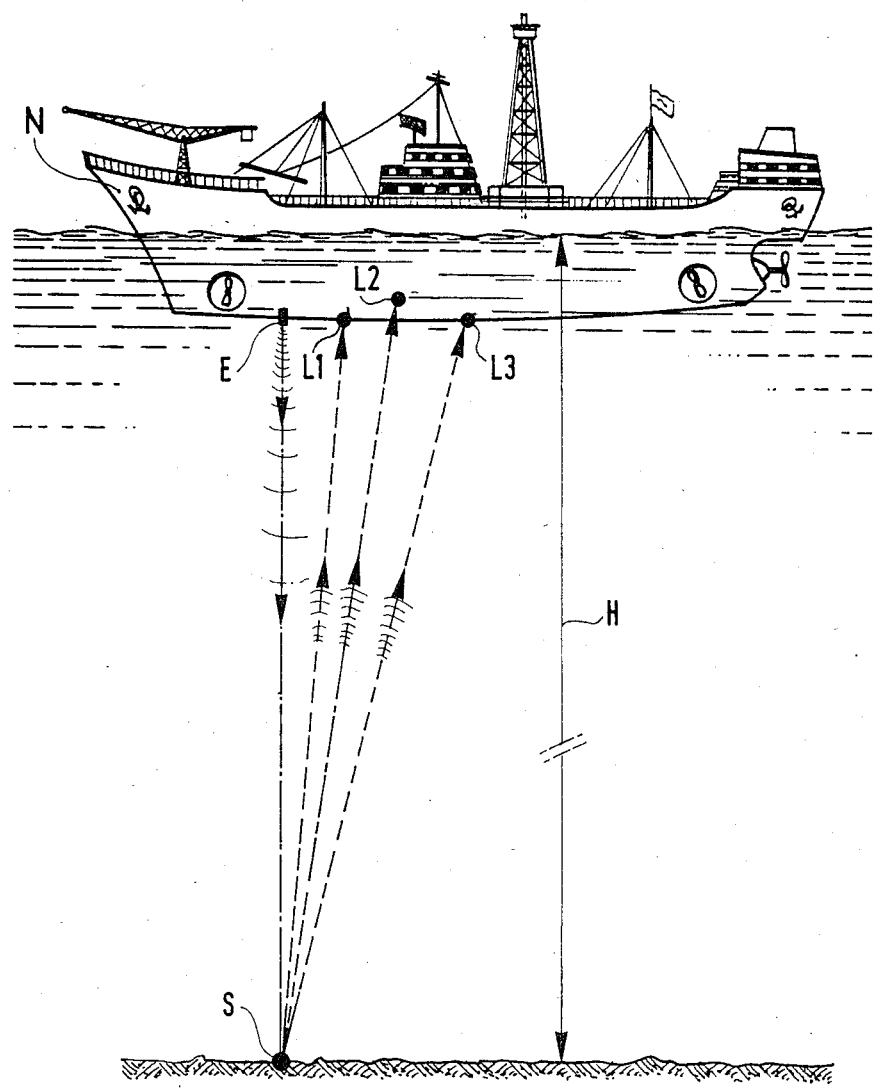
FIGS. 1 and 2 are perspective illustrations of known distance measuring apparatuses.
Figure 2:
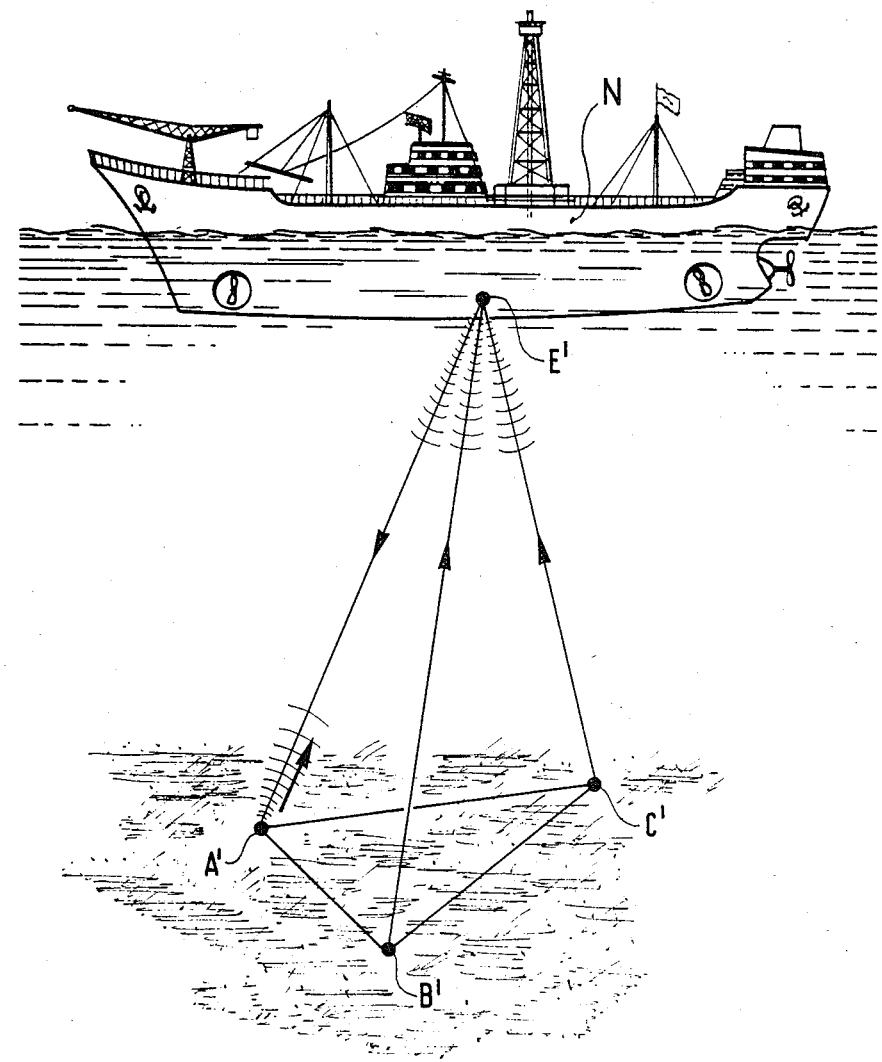

The vessel N e.g. a drilling ship or platform is associated with dynamic anchoring means which require continually updated information (e.g. once a second) concerning its position relative to a point on the bottom, e.g. the entrance P to a well being drilled.

The working conditions include two constraints which cannot be reduced:

(a) the vessel is noisy both because of its positioning motors and because of the equipment driving the string of drilling rods, this ship-generated noise being added to noise from the sea; and (b) the depth is greater than 3000 meters.

Apparatus in accordance with the invention comprises three sets of equipment:

I - On the bottom of the vessel

There are at least three acoustic receivers (hydrophones) disposed at the corners H1, H2 and H3 of a horizontal triangle. If the ship is already fitted with four hydrophones disposed at the corners of a rectangle, three of them will be used in normal service, with the fourth being used as a spare in the event of one of the other three breaking down.

These hydrophones serve to detect the arrival instant of acoustic pulses of given form emitted at a given frequency f1 (e.g. 32 kHz).

There is at least one acoustic emitter r on the bottom of the vessel. It is an interrogation transducer I and emits a sound signal which constitutes an interrogation code made up of an appropriate combination of two or three frequencies (7, 9 and 11 kHz for example). Some ships are equipped with two transducers of the above mentioned type. In such cases only one of them is used in normal operation with the second being used as a spare in the event of the first breaking down.

The three codes used by the transducer I will be designated as a, b and c.

II - On the bottom

At least three acoustic responders A, B and C are disposed on the water bed, and each of them responds to interrogation by a respective one of the codes a, b and c. The bottom responders are disposed at the corners of a triangle adjacent to the point P.

The sides of the triangle are more or less equal and their length is preferably between 5% and 8% of the depth of the water. Thus for a depth of 6000 meters, the sides of the triangle will be between 300 and 500 meters. The acoustic responders A, B and C are placed by being dropped overboard from the vessel itself or from an auxiliary vessel. It is supposed that the distances AB, BC and CA are known (and it is shown below how this information can be obtained).

The responders A, B and C have the following acoustic characteristics:

(A) The respond by emitting a pulse of determined level and form at a given frequency f2 (e.g. 25 kHz) in either of the following cases:

1. On reception of their own interrogation code a, b and c as already mentioned above; or 2. On detecting a pulse at frequency f2 as emitted by one of their neighbours A, B or C provided it is above a given threshold.

(B) Once a pulse has been emitted for either of the above reasons, the responders are made inactive for a given fixed period (e.g. one second) imposed by the maximum dimension of the triangle A, B, C.

(C) A pulse is emitted at frequency f2 with a certain delay relative to the arrival instant of the event which triggers the pulse; the different responders have different delay periods (tA for A, tB for B, tC for C) such that the responses are emitted in accordance with a determined sequence so that the pulses can subsequently be identified.

III - Submerged

An acoustic emitter/receiver R is disposed at a distance from the vessel such that vessel noise is highly attenuated. This emitter/receiver is preferably submerged to a depth h of around 7% of the depth at the position under consideration, which for a depth of 6000 meters means that the relay emitter/receiver should be placed at about 400 meters below the water level.

It may be suspended from a buoy located about 200 meters from the vessel and tethered thereto, or (as shown in the figure) it may be suspended from a derrick. If the vessel is a drilling ship, it may even by possible to fix the relay emitter/receiver on a hoop held around the drilling string while leaving the string free to rotate.

The relay comprises an acoustic responder in its upper portion and a hydrophone in its lower portion. These components are arranged to operate as follows:

The relay responds to a pulse at the frequency f1 on reception of any of the codes a, b and c. The pulse is then emitted with a short known delay t0;

The relay responds to a pulse at frequency f1 with the same delay t0 on detecting each pulse of frequency f2.

The apparatus operates as follows: the positions of the responders A, B and C are assumed to be known (lengths of the sides of the triangle and their orientation relative to North); a method of obtaining this information is explained below.

Figure 3:
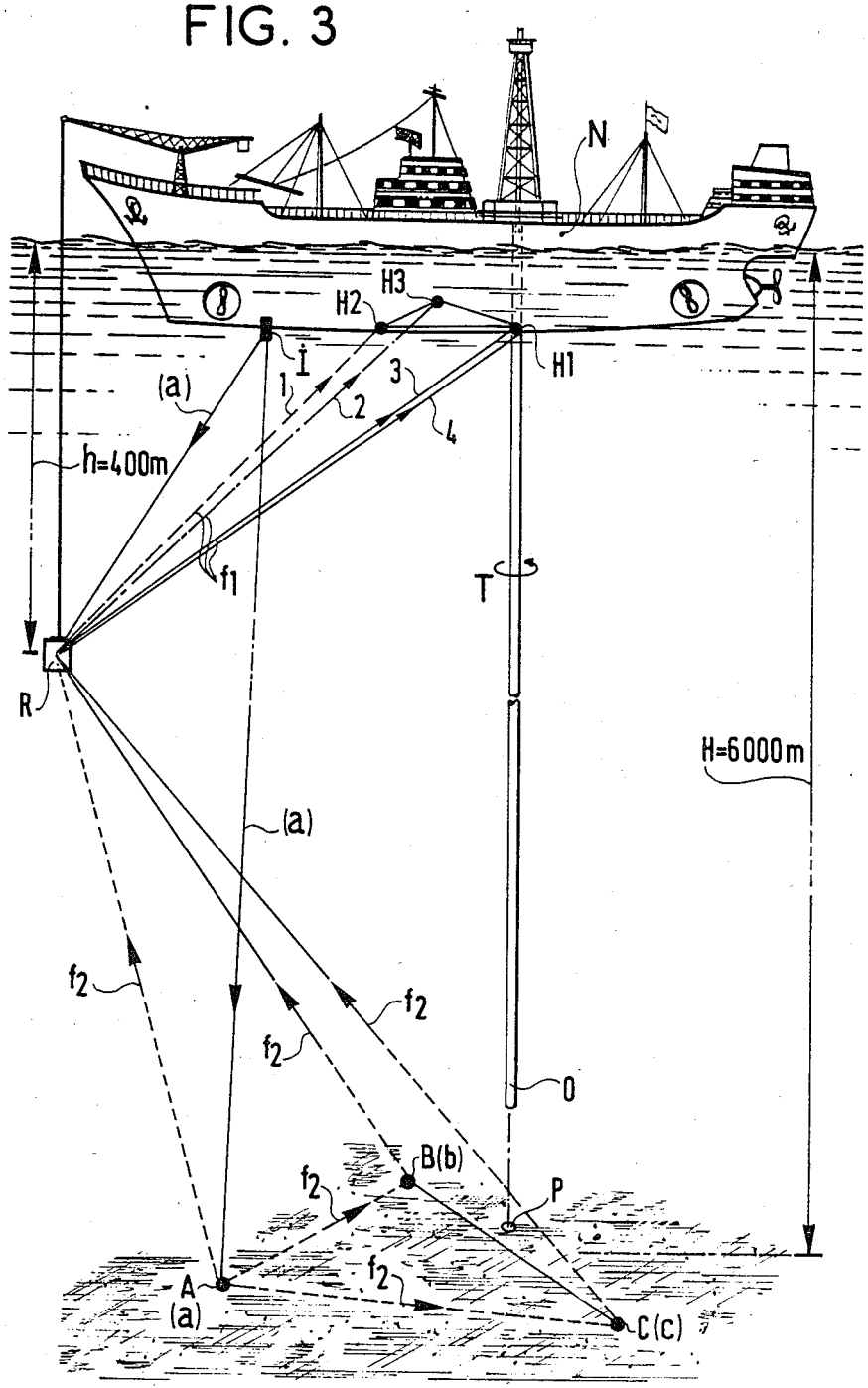
FIG. 3 is a perspective illustration of the various components of apparatus in accordance with the present invention, and showing the paths of various signals.

The transducer I emits one of the codes a, b or c, for example the code a: the relay R detects the code a and responds by emitting at the frequency f1. The responses (paths 1, 2 and 3 FIG. 3) are detected by the hydrophones H1, H2 and H3 and on the basis of these responses the distance RH1, RH2 and RH3 are calculated. Given the orientation of the vessel, the coordinates of the point R can be determined without ambiguity. (The calculation is the same as that required on a conventional short base as in FIG. 1).

The responder A detects its code a and in response it emits a pulse at frequency f2, thereby triggering responses at the frequency f2 in the other two hydrophones B and C.

Figure 4:
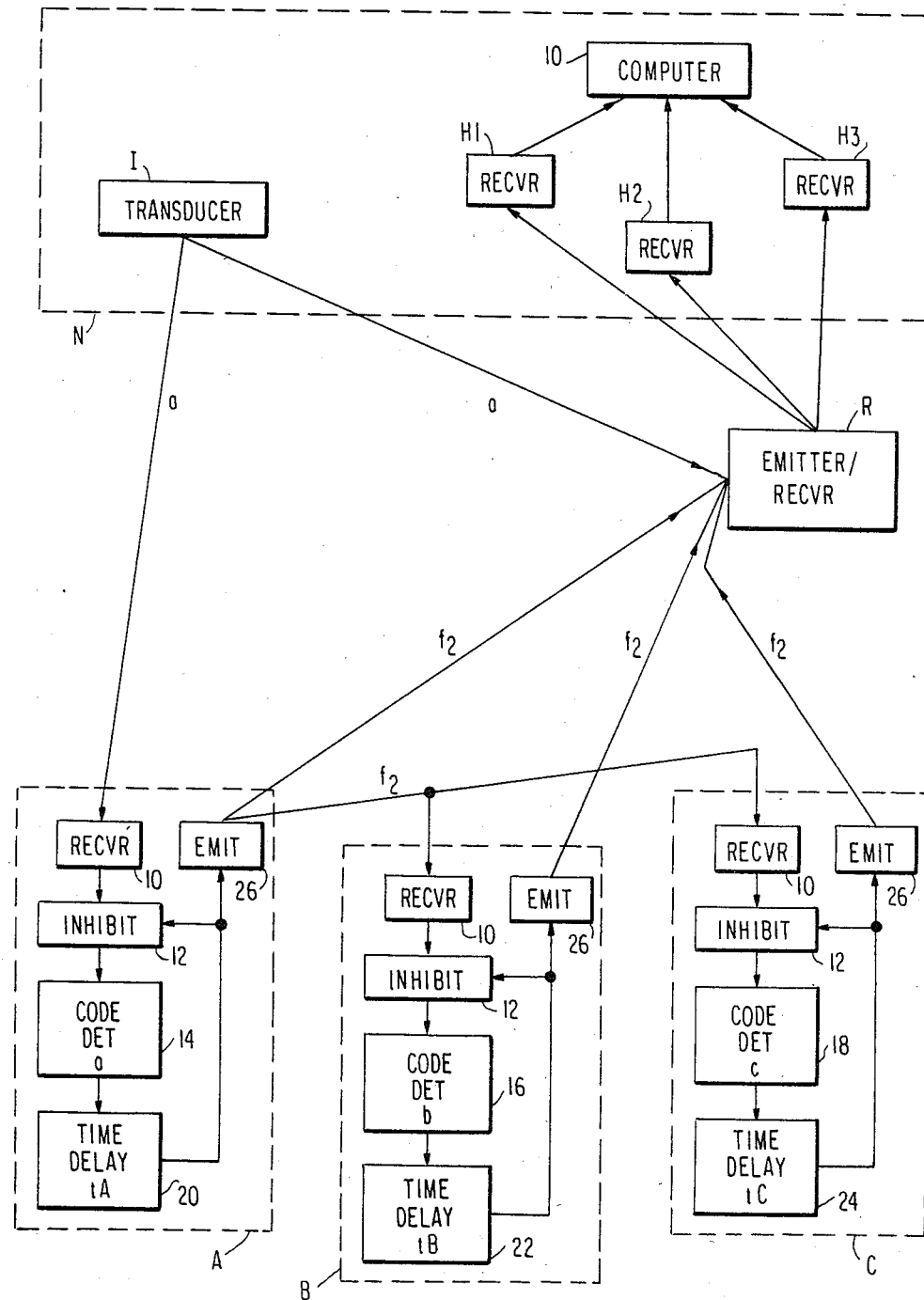
FIG. 4 is a block diagram of the electronic circuitry of the invention.

These responses emitted at timing intervals proper to each bottom emitter are received by the relay R which responds by re-emitting at the frequency f1. One of the hydrophones (H1 in the figure) receives this re-emission (path 4 in FIG. 3) and transmits information to a computer 10 (FIG. 4) which calculates the path differences RB−RA, RC−RA and RB−RC and consequently the lengths of the edges of the pyramid RABC, given the depth h at which the relay I is immersed and the depth H of the bottom.

Knowing thus the position of the relay R relative to the vessel and also relative to the bottom, it is possible to obtain the position of the vessel relative to the bottom.

The apparatus in accordance with the invention makes it possible to solve the problem of a noisy vessel.

It was shown earlier that going from 3000 meters to 6000 meters in depth increased the signal attenuation by 27 dB for signal pulses at 25 kHz. The important feature to preserve is the signal/noise ratio which needs to be the same for measuring at 6000 meters as it used to be for measuring at 3000 meters. The noise is almost entirely due to the vessel (and may be as much as 40 dB more than the noise due to a force 6 sea). In the conventional situation, the hydrophones are at a depth of about 40 meters and the noise is reduced by 20 log (400/40)=20 dB (divergence)+7×0.4=2.8 dB (absorption), leaving a total of 22.8 dB. further, the signal will be increased in level by 20 log (6000/5600)+7×0.4=3.4 dB. The total improvement in signal to noise ratio is thus 22.8+3.4=26.2 dB which is practically equal to the looked-for 27 dB.

Apparatus in accordance with the invention makes it possible to obtain a position measurment about once a second. The apparatus operates so long as the vessel does not drift by more than 300 meters+10% of the depth which means that the apparatus is applicable for all known types of operation, in particular for dynamic anchoring over a reference point.

The apparatus only requires conventional proven equipment for its implementation.

It will be observed that the responders A, B and C are incapable of responding to signals emitted by one of their neighbours and reflected from the surface of the sea.

The travel time of such signals is greater than the inhibition time of the responders. But the level of the signals is well below the responder operating threshold because of the attenuation due to the long path through the water.

The relay R cannot respond to an emission from A or B and reflected from the surface of the sea because its transducer is highly directional giving an extra 30 dB of attenuation to a signal which is already attenuated by 5 dB relative to the direct signal.

It was supposed above that the coordinates of the points A, B and C were known. They are obtained as follows: the vessel is supposed to be motionless during the process, and each responder A and B is successively interrogated by means of the emitter I. Let H1 be the hydrophone used for reception. The respective travel times of the signals going to A transiting AB going to B and transiting BA are measured and are connected by the following equation:

$$TA = (IA + AR + RH1)/C + tA + tO$$
$$TAB = (IA + AB + BR + RH1)/C + tA + tB = tO$$
$$TB = (IB + BR + RH1)/C + tB + tO$$
$$TBA = (IB + BA + AR + RH1)/C + tB + tA + tO$$

where C is the speed of sound; from which it can be deduced:

$$2AB = [(TAB + TBA) - (TA + TB) + (tA + tB)] \times C$$

The same measurements are performed for the other two sides BC and CA.

To complete this initial setting up, it is also necessary to known the orieintation of the triangle relative to a known direction e.g. North.

To obtain this information, a second relay R' is used disposed at a known distance from the relay R and at a known direction RR' therefrom.

Then by means of the emitter I, the characteristics of the pyramid R'ABC are measured in the same manner as was indicated in the description of how the apparatus operates.

The lengths RA and RB as well as R'A and R'B enable the triangle ABC to be positioned relative to the line RR'.

In practice, and to reduce errors, more than one measurement is taken and the results of a plurality of measurements are combined statistically.

In order to insert a tool in a drilling well P which already exists, the end of the string of rods may be provided with a hydrophone O for picking up the emissions at frequency f2 that result from one of the hydrophones A, B or C being interrogated. The hydrophone O is connected by a cable to the vessel and thus transmits signals corresponding to the time differences along the paths OA−OB, OA−OC and OB−OC.

OA, OB and OC can then be deduced which enables the position of the string of rods to be corrected relative to the well.

We claim:

1. Acoustic distance measuring apparatus for measuring the distance of a vessel N from a vertical line through a fixed point P on the bottom of a body of water, the apparatus comprising: an acoustic emitter unit and at least three acoustic receiver units disposed on the bottom of the vessel beneath the surface of the water, said receiver units being disposed at the vertices of a plane polygon; at least three acoustic emitter/receiver units placed on the water bottom in the vicinity of said fixed point P, said emitter/receiver units being disposed at the vertices of a polygon; and the improvement wherein the measuring apparatus further includes a relay acoustic emitter/receiver submerged close to the vessel at a depth where vessel noise is highly attenuated, said relay receiving acoustic waves from the vessel's emitter and including means responding by emitting acoustic waves to the vessel's receiver units thereby enabling the distances between the relay and each of the vessel's receiver units to be calculated, said bottom emitter/receiver units also receiving acoustic waves from the vessel's emitter and including means to respond in succession, i.e. after respective predetermined time delays, by emitting acoustic signals which are received by the relay and which are re-emitted therefrom after amplification to be received by one of the vessel's receiver units, thereby enabling the distances between the relay and each of the bottom emitter/receivers to be calculated on the basis of the different transit times for the signals from each bottom emitter/receiver, and further enabling the distance of the vessel from a vertical line through said fixed point to be calculated.

2. Apparatus according to claim 1, wherein said means to respond after respective predetermined time delays comprise respond means responsive to time delays which are all different.

3. Apparatus according to claim 1, wherein the bottom emitter/receivers have means defining a reception threshold level below which they do not emit any response, thereby eliminating false responses due to signals being reflected from the surface of the water.

4. Apparatus according to claim 1, wherein the relay emitter/receiver is directional so as to be insensitive to signals coming from above.

5. Apparatus according to claim 1, wherein each of the bottom emitter/receivers includes means for responding to receiving a code specific thereto, wherein the bottom emitter/receivers comprise means for emitting a signal at a given frequency f2, and wherein all the bottom emitter/receivers include means for also responding to receiving a signal at said given frequency f2.

6. Apparatus according to claim 5, wherein the relay emitter/receiver includes means for responding to receiving the codes of the bottom emitter/receivers in addition to responding to signals at said given frequency f2 at which the bottom emitter/receivers respond.

7. Apparatus according to claim 1, wherein the relay emitter/receiver includes means for responding by emitting at a frequency f1 which is different from the frequency f2 at which the bottom emitter/receivers respond.

* * * * *